(12) United States Patent
Kondo et al.

(10) Patent No.: US 9,933,569 B2
(45) Date of Patent: Apr. 3, 2018

(54) EVANESCENT LIGHT GENERATION ELEMENT AND EVANESCENT LIGHT GENERATION DEVICE

(71) Applicant: NGK Insulators, Ltd., Nagoya (JP)

(72) Inventors: Jungo Kondo, Miyoshi (JP); Shoichiro Yamaguchi, Ichinomiya (JP); Takashi Yoshino, Ama (JP); Yukihisa Takeuchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 5 days.

(21) Appl. No.: 14/853,144

(22) Filed: Sep. 14, 2015

(65) Prior Publication Data

US 2016/0047984 A1    Feb. 18, 2016

Related U.S. Application Data

(63) Continuation of application No. PCT/JP2014/057632, filed on Mar. 13, 2014.
(Continued)

(51) Int. Cl.
*G02B 6/26*    (2006.01)
*G02B 6/122*    (2006.01)
(Continued)

(52) U.S. Cl.
CPC .......... *G02B 6/1228* (2013.01); *G02B 6/124* (2013.01); *G02B 6/4203* (2013.01);
(Continued)

(58) Field of Classification Search
None
See application file for complete search history.

(56) References Cited

U.S. PATENT DOCUMENTS

| 4,729,620 A * | 3/1988 | Pavlath ............. G01C 19/721 |
| | | 359/900 |
| 6,212,314 B1 * | 4/2001 | Ford ................. G02B 6/12007 |
| | | 385/10 |

(Continued)

FOREIGN PATENT DOCUMENTS

| EP | 0 962 809 | 3/2005 |
| JP | 61-249004 | 11/1986 |

(Continued)

OTHER PUBLICATIONS

English Translation of Written Opinion of the ISR dated Jun. 1, 2014 (Application No. PCT/JP2014/057632).
(Continued)

*Primary Examiner* — Chris Chu
(74) *Attorney, Agent, or Firm* — Burr & Brown, PLLC (57) ABSTRACT

An evanescent light generation element for oscillating evanescent light from an optical waveguide to a clad layer, including a 0.1 µm-10 µm thin layer composed of a ferroelectric single crystal or oriented crystal having first and second principal surfaces, and incident side end and exit side end surfaces. A ridge optical waveguide is formed in the thin layer and extends between the incident and exit side end surfaces of the thin layer. At least a pair of grooves is formed on both sides of the ridge optical waveguide in the thin layer and opened at the first principal surface of the thin layer. A clad layer is provided on the first principal surface or the second principal surface. A width of the ridge optical waveguide at the exit side end surface is less than a width of the ridge optical waveguide at the incident side end surface.

9 Claims, 10 Drawing Sheets
(2 of 10 Drawing Sheet(s) Filed in Color)

Related U.S. Application Data (60) Provisional application No. 61/786,971, filed on Mar. 15, 2013.

(51) Int. Cl.
  *G02B 6/124* (2006.01)
  *G02B 6/42* (2006.01)
  *G02B 6/12* (2006.01)

(52) U.S. Cl.
  CPC .. *G02B 6/4206* (2013.01); *G02B 2006/12059* (2013.01); *G02B 2006/12097* (2013.01); *G02B 2006/12107* (2013.01)

(56) References Cited

U.S. PATENT DOCUMENTS

| | | | |
|---|---|---|---|
| 7,373,065 | B2 | 5/2008 | Yamaguchi et al. |
| 7,875,146 | B2 | 1/2011 | Yoshino |
| 8,184,360 | B2 | 5/2012 | Yoshino |
| 2001/0055453 | A1* | 12/2001 | Mizuuchi ............ G02F 1/3775 385/122 |
| 2010/0226002 | A1* | 9/2010 | Yoshino ............... G02F 1/3775 359/328 |

FOREIGN PATENT DOCUMENTS

| | | |
|---|---|---|
| JP | 05-232537 | 9/1993 |
| JP | 05-341343 | 12/1993 |
| JP | 07-02811 | 1/1995 |
| JP | 09-181395 | 7/1997 |
| JP | 11-326966 | 11/1999 |
| JP | 2001-042149 | 2/2001 |
| JP | 2001-183713 | 7/2001 |
| JP | 2003-107260 | 4/2003 |
| JP | 2009-217133 | 9/2009 |
| JP | 2009-222872 | 10/2009 |
| JP | 2010-704593 | 9/2010 |
| WO | 2006/041172 | 4/2006 |

OTHER PUBLICATIONS

German Office Action (With English Translation), German Application No. 11 2014 001 386.2, dated Dec. 20, 2017 (10 pages).

\* cited by examiner

EVANESCENT LIGHT GENERATION ELEMENT AND EVANESCENT LIGHT GENERATION DEVICE

TECHNICAL FIELD

The present invention relates to an evanescent light generation element and device for obtaining evanescent light from an optical waveguide to a clad layer.

BACKGROUND ART

In an optical waveguide device such as an optical modulation element and a second-order higher harmonic generation element, a pair of ridge grooves is formed in an optical waveguide substrate, and a ridge optical waveguide is formed between the ridge grooves. Then, the optical waveguide substrate is attached to an independent support substrate, and it is known that phase matching is attained by configuring the optical waveguide substrate to be a thin plate equal to or less than 10 μm in thickness.

SUMMARY OF THE INVENTION

In such device, containment of the light in the ridge optical waveguide is not strict, and a transmission of the light to the clad layer side such as an adhesion layer and the support substrate is observed.

The inventor is studying sensing by using the evanescent light.

However, in the course of this study, it is understood that an intensity of the evanescent light is relatively low and is unstable, so that it is desired to more efficiently utilize the evanescent light.

An object of the present invention is to stably oscillate evanescent light in evanescent light generation element and device for obtaining the evanescent light from an optical waveguide to a clad layer.

The present invention provides an evanescent light generation element for obtaining evanescent light from an optical waveguide to a clad layer: said element comprising;

a thin layer comprising a ferroelectric single crystal or oriented crystal, having a thickness of 0.1 μm or larger and 10 μm or smaller and comprising a first principal surface, a second principal surface, an incident side end surface and an exit side end surface;

a ridge optical waveguide formed in said thin layer and extending between the incident side end surface and the exit side end surface of said thin layer;

at least a pair of grooves formed on both sides of said ridge optical waveguide in said thin layer and opening at said first principal surface of said thin layer; and a clad layer provided on said first principal surface or said second principal surface;

wherein a width of said ridge optical waveguide at said exit side end surface is less than a width of said ridge optical waveguide at said incident side end surface; and wherein said evanescent light is obtained in a neighborhood of said exit side end surface of said ridge optical waveguide.

Moreover, the present invention provides an evanescent light generation device comprising a laser light source oscillating the evanescent light and a laser light to be made incident to the incident side end surface of the thin layer, wherein the laser light includes a linearly polarized optical wave polarized in a normal direction of the first principal surface of the thin layer.

According to the present invention, the evanescent light can be stably generated in the neighborhood of the exit side end surface of the optical waveguide element.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EMBODIMENTS

Figure 1:
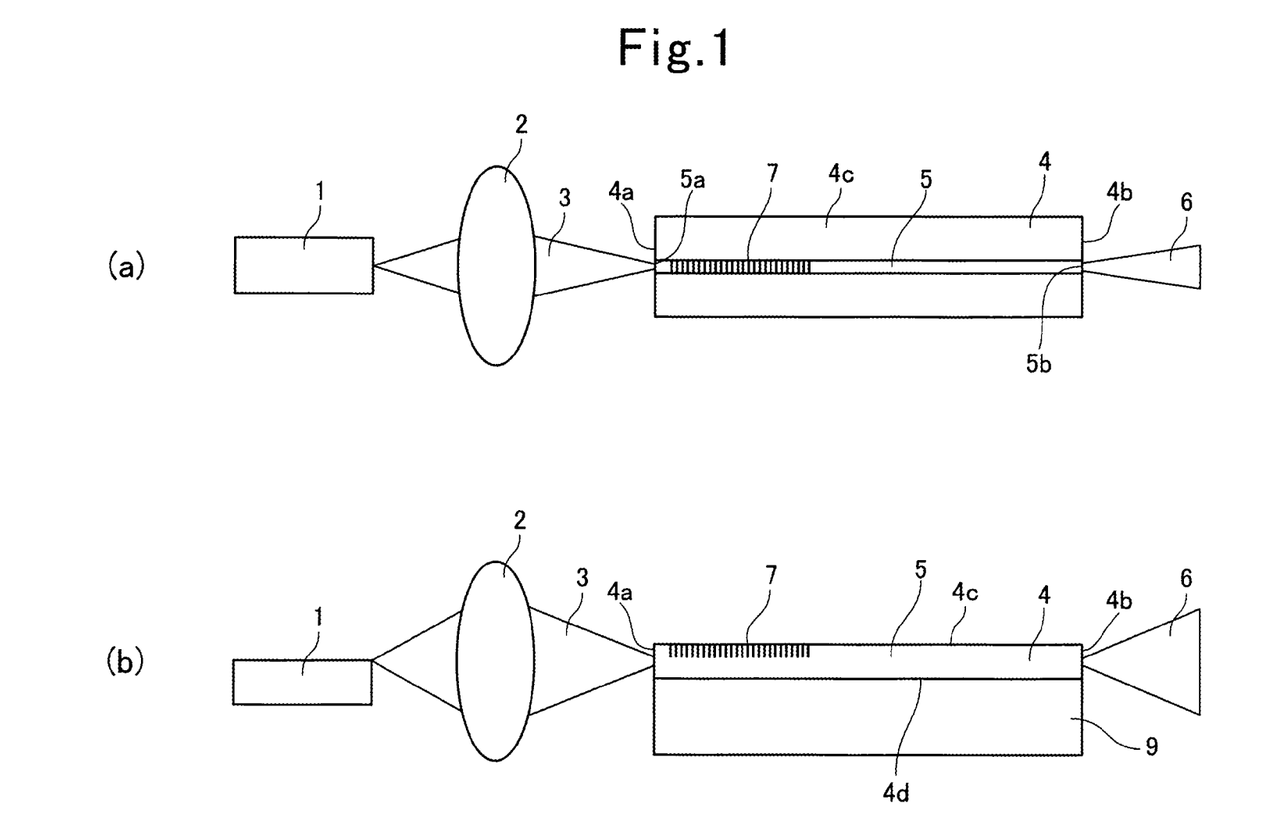
FIG. 1(a) is a schematic top view of a device according to the present invention.
FIG. 1(b) is a schematic side view of the device in FIG. 1(a).

As shown in FIG. 1, laser light oscillated from a light source 1 is converged by a converging system 2, and is made incident to a thin layer 4 as indicated by an arrow 3. The thin layer includes a first principal surface 4c and a second principal surface 4d. The second principal surface 4d of the thin layer is bonded to a clad layer 9. For example, one line of ridge optical waveguide 5 extends from an incident side end surface 4a of the thin layer toward an exit side end surface 4b. A description will later be given of a specific form of the ridge optical waveguide 5. The laser light is made incident to an end portion 5a of the ridge optical waveguide 5 as indicated by the arrow 3, transmits through the ridge optical waveguide, and exits from an end portion 5b on the exit side as indicated by an arrow 6.

It should be noted that though the laser light is made incident to the thin layer 4 by the converging system 2 in FIG. 1, but a butt joint in which the laser light is directly made incident from the light source 1 to the thin layer 4 may be employed.

On this occasion, a width of the ridge optical waveguide 5 at the exit side end surface 4b is narrower than a width of the ridge optical waveguide at the incident side end surface 4a according to the present invention.

It should be noted that a diffraction grating 7 is formed in the thin layer, and the diffraction grating 7 serving as a reflector constructs a resonator along with the laser light source 1, thereby enabling incidence of the laser light extremely high in coherency according to this embodiment.

Figure 2:
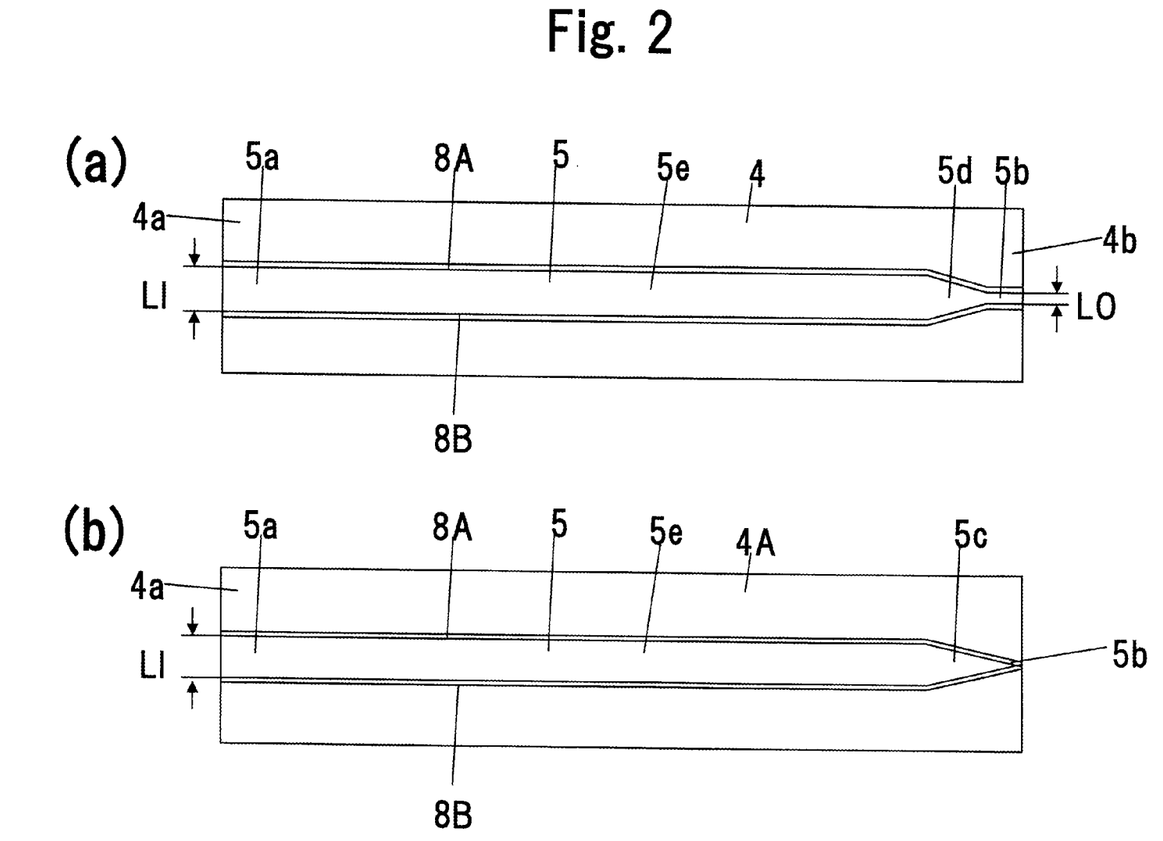
FIGS. 2(a) and 2(b) are respectively schematic top views of elements according to the present invention.

In an example in FIG. 2(a), the ridge optical waveguide 5 includes a narrow width portion 5b provided in a neighborhood of the exit side end surface 4b, a main body portion 5e extending from the incident side end surface 4a to the narrow width portion 5b, and a coupling portion 5d provided between the main body portion 5e and the narrow width portion 5b. A width LO of the ridge optical waveguide 5 at the exit side end surface 4b is narrower than a width LI of the ridge optical waveguide on the incident side end surface 4a.

In an example in FIG. 2(b), the ridge optical waveguide 5 includes a tapered portion 5c provided in a neighborhood of the exit side end surface 4b, in which a width in the tapered portion is decreased toward the exit side end surface, and the main body portion 5e extending from the incident side end surface 4a toward the tapered portion 5c. In this example, though the width of the tapered portion is zero at the exit side end surface, the width may not be 0 as long as less than LI.

The ridge optical waveguide is sandwiched, and is contoured between ridge grooves 8A and 8B provided on both sides thereof. Moreover, the thin layer 4 is also respectively provided continuously on the outsides of the ridge grooves 8A and 8B with respect to the optical waveguide.

Figure 3:
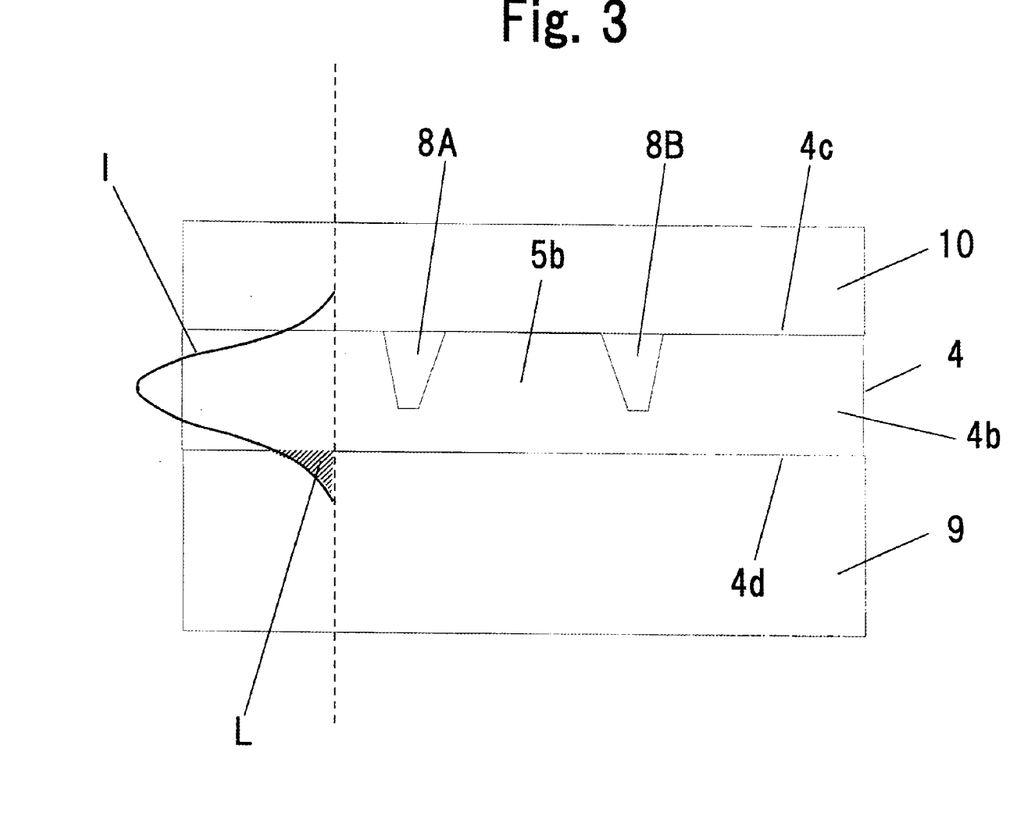
FIG. 3 is a schematic diagram of the element according to the present invention viewed from an exit side end surface side.

FIG. 3 is a schematic diagram of the element shown in FIG. 2(a) viewed on the exit side end surface side.

In this example, not only the clad layer 9 is provided on the second principal surface 4d of the thin layer 4, but also a clad layer 10 is provided on the first principal surface 4c.

On this occasion, in the neighborhood of the exit side end surface 4b, the width of the end portion 5b of the ridge optical waveguide is narrow, and the optical beam is converged and then exits. On this occasion, the ridge grooves 8A and 8B is opened at the first principal surface 4c side, and containment of the light transmitting through the ridge optical waveguide 5b is thus relatively weak on the clad layer 9 side.

Moreover, since the thin layer is made of a single crystal or oriented crystal, a loss caused by scattering during the transmission through the ridge optical waveguide is thus low, and light transmission high in linear polarization can be realized by matching the polarization of the incident light with a direction of an optical axis or an orientation axis. Further, the light in converged state is collected at the end portion 5b narrow in the width, and the waveguide mode is such a form that transmission (evanescence) tends to occur toward the clad layer.

It should be noted that FIG. 3 shows such an example that the optical energy transmits to the clad portion on the second principal surface on the opposite side of the first principal surface at which the ridge grooves open. However, the optical energy may be caused to transmit to the clad portion on the first principle surface at which the ridge grooves open, and the evanescent light of the transmitted energy may be generated and utilized.

Such a structure that this element is bonded to an independent support substrate may be formed. In this case, a bottom portion of the clad layer 9 of the element may be used as a bonding surface, or a top portion of the clad layer 10 may be used as a bonding surface. As a bonding method, the adhesion method and the direct bonding method can be exemplified. Thus, according to this embodiment, the clad layer 9 (and/or the clad layer 10) may be directly bonded to the support substrate, or the clad layer 9 (and/or the clad layer 10) may be bonded via a bonding layer to the support substrate.

Further, the clad layer itself may be constructed by the support substrate. In this case, an interface between the thin layer and the support substrate is the bonding surface, and the support substrate itself thus functions as the clad layer 9 (and/or the clad layer 10).

As a result, as schematically shown in a chart on the left side of FIG. 3, a light intensity I has such a shape as to largely slopes toward the clad layer 9 side, and a hatched portion L of the extension corresponds to the evanescent light.

The evanescent light toward the clad layer 9 side can be stably generated by using this element.

Figure 4:
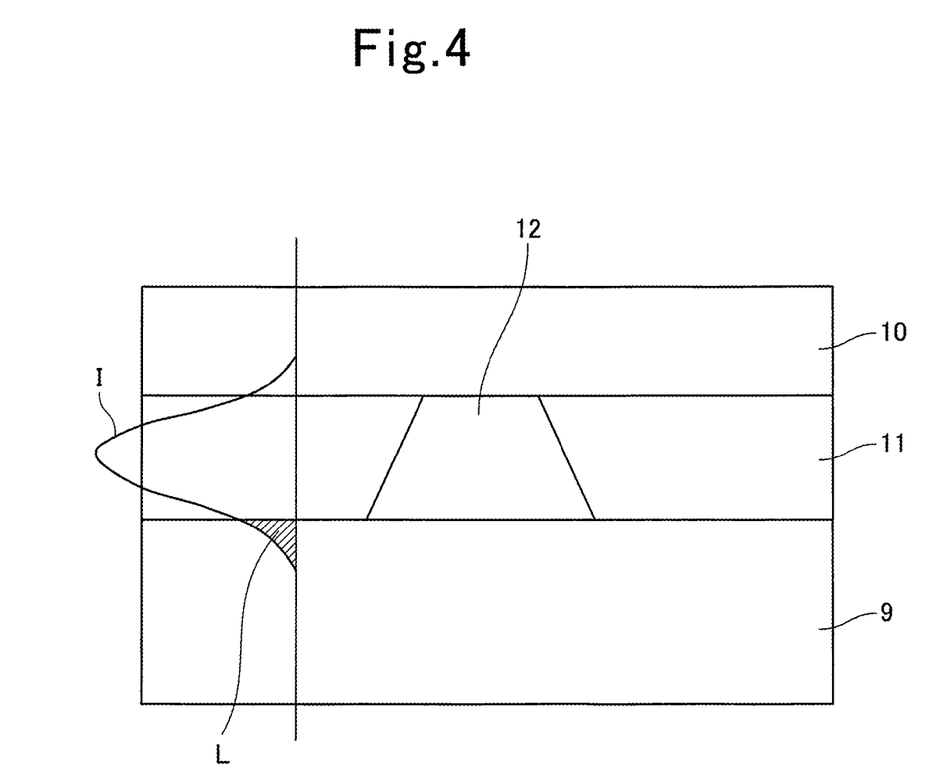
FIG. 4 is a schematic diagram of an element of a comparative example viewed from the exit side end surface side.

On the other hand, for example, as shown in FIG. 4, if a channel optical waveguide 12 is embedded in clads 9, 10 and 11 by a thin film fabrication process, such a structure that the transmission portion L of the light is small and the intensity of the evanescent light is low is provided. It is hard to stably generate the evanescent light.

In terms of the coupling efficiency to the semiconductor laser, the thickness of the thin layer is preferably equal to or more than 0.5 µm, and equal to or less than 2 µm. However, this thickness of the thin layer results in very strong multimode waveguide in the embedded structure, so that the single mode excitation is thus not available. Therefore, there poses such a problem that the transmission loss is large, so that sufficient evanescent light cannot be obtained.

A further description will now be given of respective components of the present invention.

The thin layer is made of a ferroelectric single crystal or oriented crystal.

A material of the thin layer is selected depending on the required refractive index, and preferably includes lithium niobate, lithium tantalate, lithium niobate-lithium tantalate solid solution, zinc oxide, gallium arsenide, gallium nitride, indium phosphide, gallium oxide, potassium tantalate, and potassium niobate tantalate as basic compositions. The material may include a dopant.

The ferroelectric substance, which is the material of the thin layer, may include at least one type of metallic element selected from a group consisting of magnesium (Mg), zinc (Zn), scandium (Sc) and indium (In) in order to further increase the optical damage resistance of the optical waveguide, and magnesium is particularly preferred. The ferroelectric substance may include a rare earth element as the dopant. The rare earth element acts as an additional element for laser oscillation. As the rare earth element, Nd, Er, Tm, Ho, Dy and Pr are particularly preferred.

Moreover, in a preferred embodiment, the refractive index of the material constructing the thin layer is equal to or more than 2.3.

The material constructing the thin layer is a single crystal or oriented crystal. On this occasion, the single crystal is a single crystal in which atoms are regularly arranged over the entire crystal, and a material having double refraction is particularly preferred. The reason for this is that light transmission high in linear polarization is realized as described above. However, the single crystal is not limited only to this material, and includes an industrially available oriented crystal. In other words, the crystal may contain defects to some extent, strains and impurities, and only needs to be distinguished from the polycrystal (ceramic).

The thickness of the thin layer is equal to or less than 10 µm in terms of the effective generation of the evanescent light, and more preferably equal to or less than 2 µm. Moreover, the thickness of the thin layer is equal to or more than 0.1 µm in terms of handling, and more preferably equal to or more than 0.4 µm.

Particularly, the thickness of the thin layer is preferably equal to or more than 0.5 µm and equal to or less than 3 µm, in terms of the increase in the coupling efficiency in order to couple the semiconductor laser light to the optical waveguide.

The ridge optical waveguide is formed in the thin layer, and extends between the incident side end surface and the exit side end surface of the thin layer. Moreover, at least a pair of grooves is formed on both sides of the ridge optical waveguide on the thin layer and opened at the first principal surface of the thin layer.

According to the present invention, the clad layer is provided on the second principal surface of the thin layer. Another clad layer may be provided on the first principal surface on the opposite side.

According to the present invention, the width LO of the ridge optical waveguide at the exit side end surface is less than the width LI of the ridge optical waveguide at the incident side end surface, and, as a result, strong evanescent light can be obtained from the neighborhood of the exit side end surface of the ridge optical waveguide.

The width of the ridge optical waveguide is a width of a flat portion on the surface of the ridge optical waveguide viewed in a travel direction of the light. The depth of the groove is a depth from the flat portion on the surface of the ridge optical waveguide to a bottom surface of the groove. The width and the depth of the groove of the ridge optical waveguide are measured by an AFM (atomic force microscope).

The neighborhood of the exit side end surface corresponds to a portion having the width LO of the ridge optical waveguide in FIG. 2(a), or the tapered portion in FIG. 2(b). If the width of the optical waveguide is equal to or less than 2 µm, the light intensity of the evanescent light is high, and if the width is equal to or less than 1 µm, stronger evanescent light can be obtained.

The evanescent light refers to leak light to the clad layer, which cannot be contained in the thin layer. For sensing applications, an adsorbent or the like is provided in the clad portion, thereby absorbing a specific material, and the optical absorption property thereof is evaluated for using as a sensor.

(Width LO of ridge optical waveguide on exit side end surface)/(Width LI of ridge optical waveguide on incident side end surface) is preferably equal to or less than 1/3 and is more preferably equal to or less than 1/6, in terms of the effective acquisition of the evanescent light. Even if LO is zero, the evanescent light is obtained, and the lower limit of LO/LI can thus be zero.

In a preferred embodiment, the ridge optical waveguide includes the narrow width portion provided in the neighborhood of the exit side end surface, the main body portion extending from the incident side end surface toward the narrow width portion, and the coupling portion provided between the main body portion and the narrow width portion.

An increase in the transmission loss caused by a sharp change in the optical waveguide width can be suppressed by providing the coupling portion. In this respect, a smooth monotonic decrease in the optical waveguide width in the coupling portion from the main body portion toward the narrow width portion is preferred, and the width may decrease in a form of a first-order function, or in a form of a curve.

In a preferred embodiment, the ridge optical waveguide is provided in the neighborhood of the exit side end surface, and includes the tapered portion decreasing in the width toward the exit side end surface, and the main body portion extending from the incident side end surface toward the tapered portion.

An increase in the transmission loss caused by a sharp change in the optical waveguide width can be suppressed by providing the tapered portion. In this respect, a smooth monotonic decrease in the optical waveguide width in the tapered portion from the main body portion toward the narrow width portion is preferred, and the width may decrease in a form of a first-order function, or in a form of a curve.

In this embodiment, the width of the tapered portion is particularly preferably zero at the exit side end surface, and an evanescent light quantity can further be stabilized.

In a preferred embodiment, the refractive index of the clad layer is equal to or less than 1.4.

The clad layer may be an independent support substrate, a bonding layer provided between the support substrate and the thin film, a buffer layer formed on the principal surface of the thin layer, or a combination thereof.

As the material of the buffer layer, silicon oxide, magnesium fluoride, silicon nitride, alumina, and tantalum pentoxide may be exemplified.

The material of bonding layer may be an inorganic adhesive, an organic adhesive, or a combination of the inorganic adhesive and the organic adhesive. Moreover, in terms of a low refraction index material, the bonding layer may be an interlayer insulating film called low-k material used for a semiconductor LSI and the like.

Further, the bonding method may be direct bonding method in addition to the adhesion. As the direct bonding method, the room temperature bonding is preferred.

A specific material of the support substrate is not particularly limited, and lithium niobate, lithium tantalate, glass such as quartz glass, rock crystal, and Si may be exemplified. In this case, in terms of the thermal expansion difference, the ferroelectric layer and the support substrate are preferably made of the same material, and lithium niobate single crystal is particularly preferred.

In a preferred embodiment, the grooves are formed by laser ablation processing, dry etching, or wet etching.

In the case of the laser ablation processing, the grooves and the ridge waveguide are formed by irradiating laser light on a surface of a material substrate made of the ferroelectric material.

If the scan speed is low, the grooves become deep, a groove width increases, and a width of the ridge waveguide decreases. If the scan speed is high, the grooves become shallow, a groove width decreases, and a width of the ridge waveguide increases. Thus, the optical waveguide width can be decreased by decreasing the scan speed in the neighborhood of the exit side end surface.

Moreover, the optical waveguide width can be controlled by setting a mask shape for the processing to a target shape.

The laser light for the processing is not particularly limited, and is selected depending on the material to be processed. In a preferred embodiment, the half width of a pulse of the laser light is equal to or less than 10 nsec. Moreover, though there is not particularly a lower limit of the half width of the pulse of the laser light, the half width is preferably equal to or more than 0.5 nsec in terms of the processing of the material with a high productivity.

The wavelength of the light for the laser processing is preferably equal to or less than 350 nm, and is more preferably equal to or less than 300 nm. It is noted that the wavelength is preferably equal to or more than 150 nm in terms of practicality.

Excimer laser is ultraviolet pulse repetition oscillation laser, and is obtained by using an optical resonator for alignment in direction and extracting ultraviolet rays oscillated by gaseous compound such as ArF (wavelength: 193 nm), KrF (wavelength: 248 nm), and XeCl (wavelength: 308 nm). As an actual light source, in addition to the excimer laser light source, a fourth higher harmonic of YAG (such as a fourth higher harmonic of the Nd-YAG laser) and an excimer lamp are presently practical.

A light irradiation element for the laser processing includes so-called batch exposure element and multiple reflection element. Moreover, as the method of forming the grooves by irradiating the laser light, the following two forms can be mentioned.

(1) Spot scan processing
(2) Slit scan processing

The scan speed of the laser light can be changed depending on a movement speed of a machining stage.

The scan speed of the laser light is selected depending on the material to be processed, and may be 0.005 mm/second to 1.0 mm/second, for example.

In the evanescent light generation device according to the present invention, a laser light source, that oscillates the laser light made incident to the incident side end surface of the thin layer, is used. The laser light made incident to the optical waveguide layer includes a linearly polarized optical wave polarized in a normal direction of the first principal surface of the thin layer.

As a solid laser oscillator, the laser oscillated by a highly reliable GaAs or InP oscillator is preferred. For example, in the case of green laser, the GaAs laser oscillating in a neighborhood of a wavelength of 1064 nm is used. The GaAs or InP laser is highly reliable, and a light source such as a laser array arranged as one-dimension array can be realized.

Moreover, a DBR laser integrating a Bragg grating with the solid laser oscillator may be used as the solid laser oscillator, or a resonator can be constructed by using a fiber grating.

When the laser light is made incident to the thin layer, the converging system as described above may be used. Alternatively, a light transmission member (such as fiber and ferrule) of the polarization plane holding type may be bonded to the optical waveguide layer.

Higher harmonics may be generated by forming a periodically polarization-reversed structure over an entirety or a portion of the length of the thin layer.

EXAMPLES

Example

Figure 5:
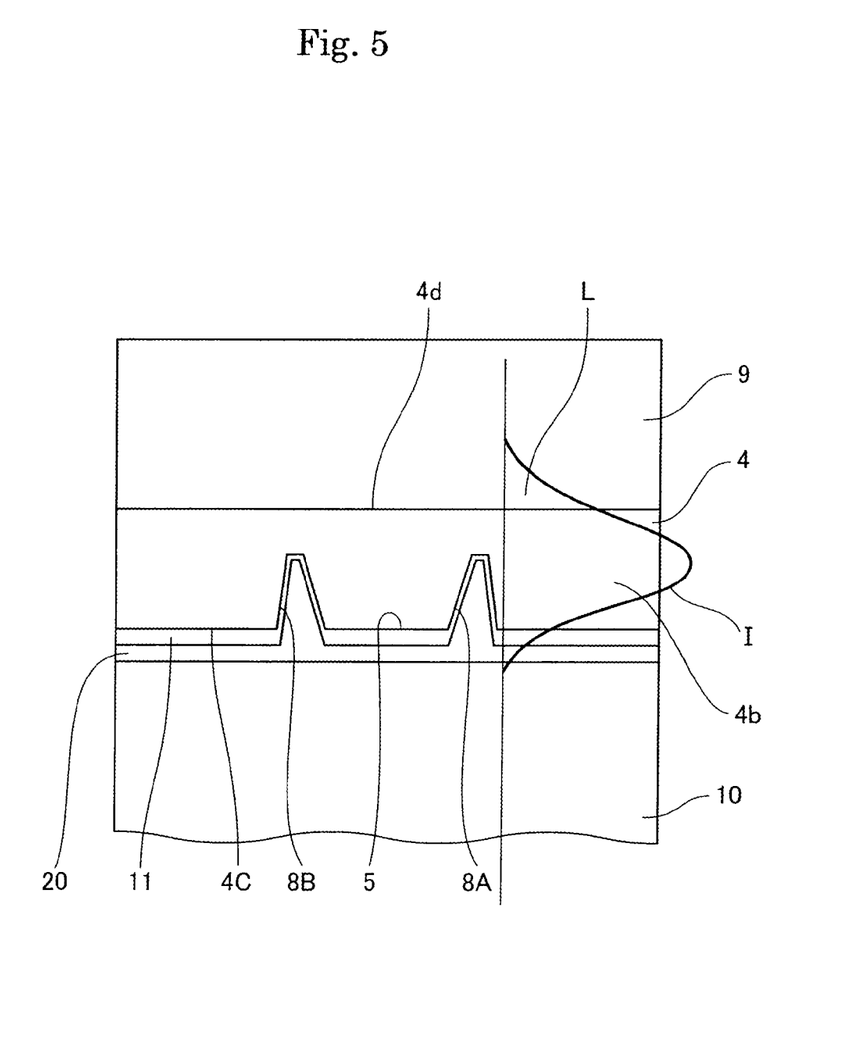
FIG. 5 is a schematic diagram of the element according to the embodiment of the present invention viewed from the exit side end surface side.

An evanescent light generation element in the form shown in FIGS. 2(a), 3, and 5 was produced.

Specifically, the element has such a structure that the thin layer 4 was made of lithium niobate crystal, and an $SiO_2$ layer was used as the top clad layer.

In other words, an Ni film was formed on a +y surface of a Y-cut MgO doped lithium niobate crystal substrate (refractive index in y axis direction: 2.3), and a pattern for forming the grooves in an x axis direction was produced by the photolithography technology. Then, the grooves 8A and 8B having a depth of 0.6 μm were formed by fluorine-based reactive ion etching using the Ni pattern as a mask, and the ridge waveguide 5 was formed between the grooves. The ridge widths LI and LO were made 3 μm and 1 μm. Then, the buffer layer 11 made of $SiO_2$ was formed as a film of 1 μm on the groove-formed surface by a sputtering machine, a sapphire substrate was used as the support substrate 10, and the buffer layer 11 and the support substrate 10 were pasted together and were adhered to each other. The refractive index of an adhesion layer 20 was 1.45, and the thickness of the adhesion layer was 0.7 μm. The refractive index of the sapphire substrate was 1.63.

Then, the side of the sapphire substrate 10 was pasted to a polishing surface plate, and the lithium niobate substrate was precisely polished into the thin layer 4 of a thickness of 1.2 μm. Then, the assembly was removed from the surface plate, and the top clad layer 9 made of $SiO_2$ was formed on the polished surface as a film of 1 μm by sputtering.

Then, the assembly was cut into bars by a dicing machine, both the end surfaces were optically polished, AR coats of 0.1% were formed on the both end surfaces, and finally tip cutting was carried out, thereby producing the evanescent light generation elements. Sizes of the element were 1 mm in the width, and 3 mm in the length.

Figure 6:
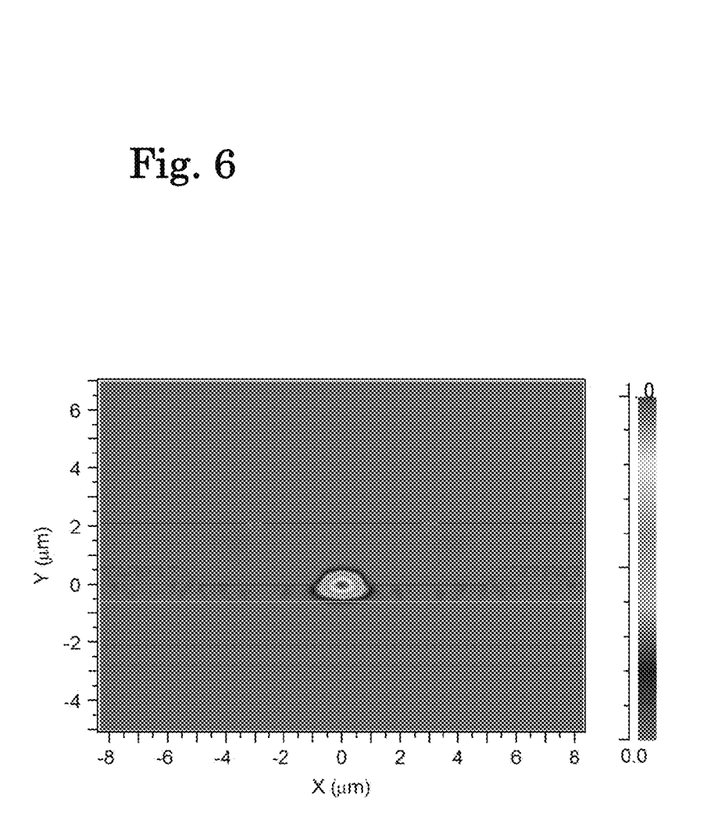
FIG. 6 is a photograph showing a mode shape of exit light obtained by using the element of FIG. 5.

The optical characteristics of the evanescent light generation element were evaluated by using semiconductor laser having a wavelength of 800 nm. As a result of a measurement of a mode shape on the output side, a mode shape of single mode excitation as shown in FIG. 6 was obtained.

Figure 7:
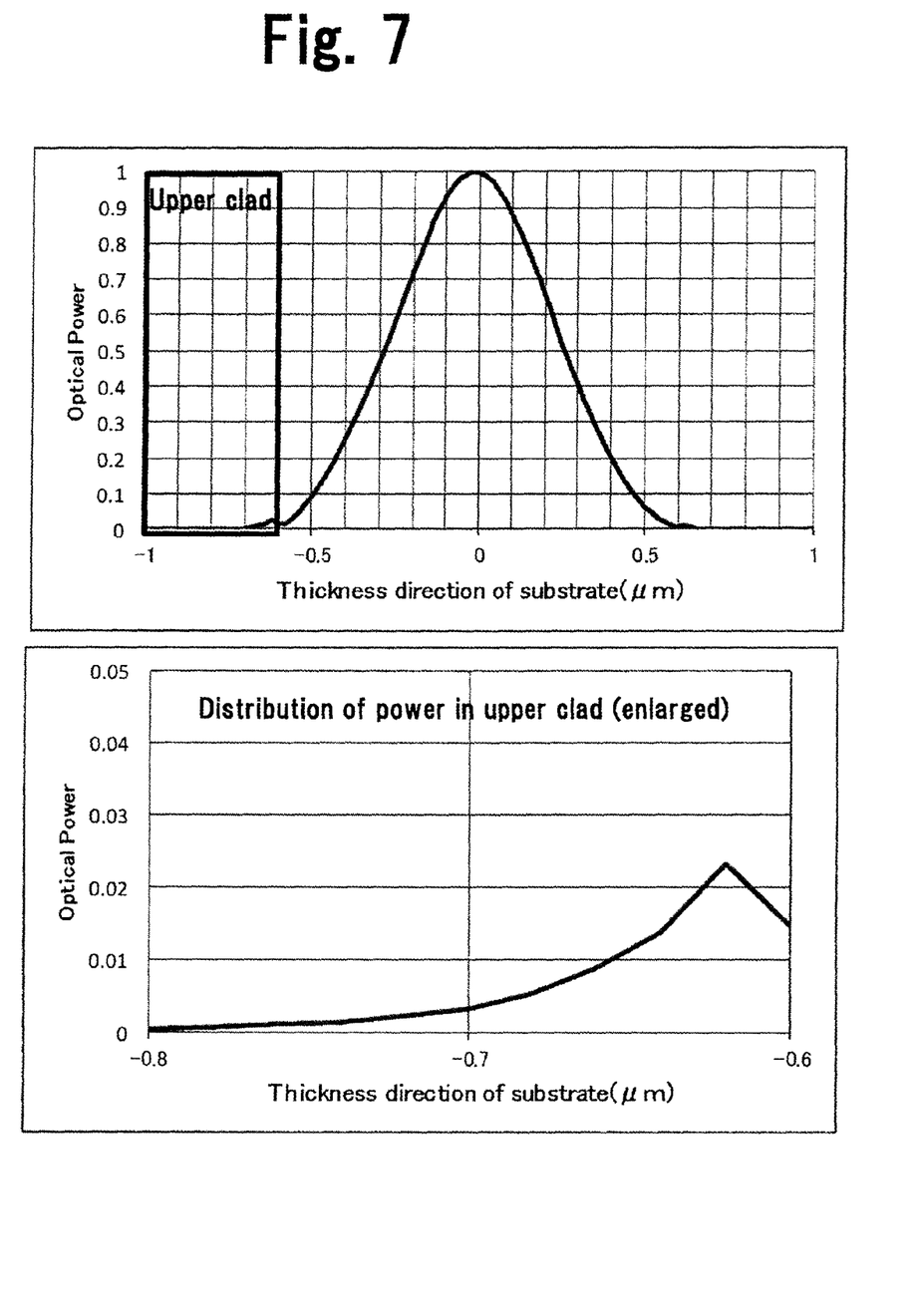
FIG. 7 is a chart showing distribution of an optical power obtained by using the element of FIG. 5.

As a result of calculation of the mode shape of this structure, it was found that the optical power transmitted to the top clad side as shown in FIG. 7, presented approximately 2% of the maximum power of the thin layer portion in a neighborhood of the interface between the top clad and the LN, and the transmission reached approximately 130 nm.

Comparative Example

Figure 8:
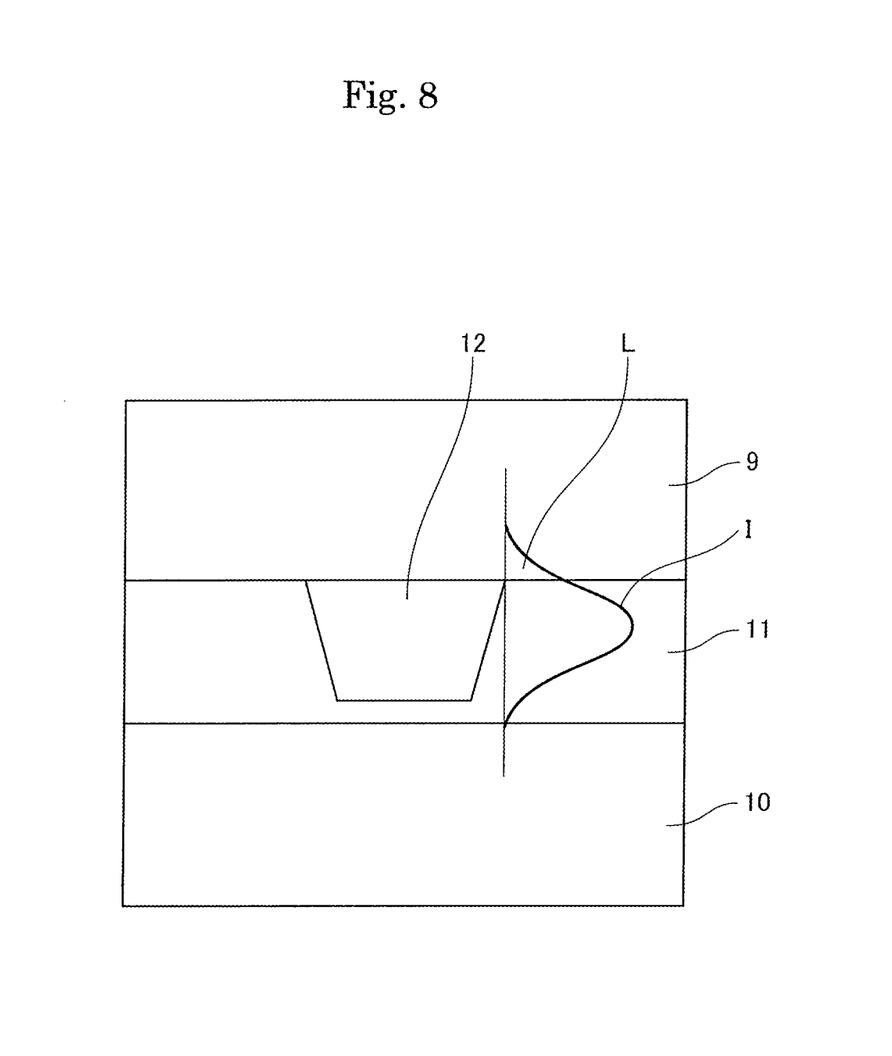
FIG. 8 is a schematic diagram of the element of the comparative example viewed from the exit side end surface side.

For comparative example, an evanescent light generation element in the form shown in FIGS. 2(a), 4 and 8 was produced. Specifically, the element had such a structure that the top clad layer was made of lithium niobate crystal and $SiO_2$.

An Ni film was formed on a +y surface of a Y-cut MgO doped lithium niobate crystal substrate (refractive index in the y axis direction: 2.3), and a pattern for forming the grooves in the x axis direction was produced by photolithography technology. Then, the grooves having a depth of 1.5 μm were formed by fluorine-based reactive ion etching using the Ni pattern as a mask, and a ridge waveguide was formed between the grooves. The ridge widths LI and LO were 3 μm and 1 μm.

Then, a buffer layer made of $SiO_2$ was formed as a film of 1 μm on the groove-formed surface by a sputtering machine, a sapphire substrate was used as the support substrate 10, and the buffer layer and the support substrate 10 were pasted together and were adhered to each other (the adhesive layer of 0.7 μm). The refractive index of the sapphire substrate was 1.63. Then, the side of the sapphire substrate 10 was pasted to a polishing surface plate, and the lithium niobate substrate was precisely polished into a thin layer of a thickness of 1.2 μm. Then, the assembly was removed from the surface plate, the top clad layer 9 made of $SiO_2$ was formed on the polished surface as a film of 3.5 μm by sputtering, and the embedded optical waveguide 12 in the form shown in FIGS. 4 and 8 was formed. In other words, this is such a form that the entire optical waveguide 12 is embedded in the clad.

Then, the assembly was cut into bars by a dicing machine, both the end surfaces were optically polished, AR coats of 0.1% were formed on the both end surfaces, and finally tip cutting was carried out, thereby producing the evanescent light generation element. Sizes of the element were 1 mm in the width, and 3 mm in the length.

Figure 9:
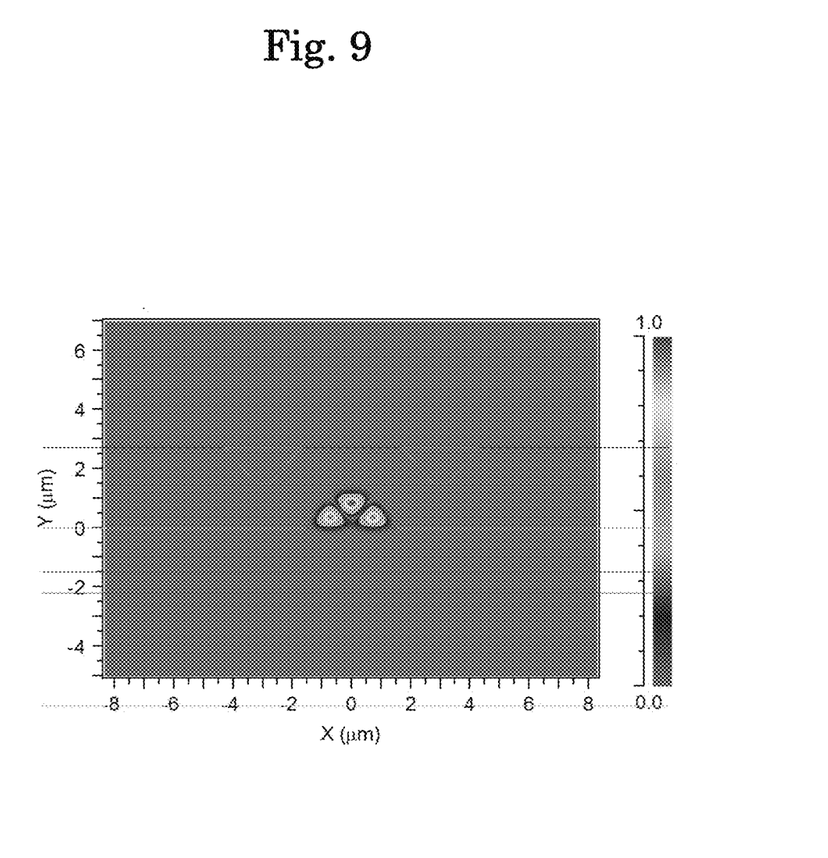
FIG. 9 is a photograph showing the mode shape of exit light obtained by using the element of FIG. 8.

The optical characteristics of the evanescent light generation element were evaluated by using semiconductor laser having a wavelength of 800 nm. As a result of a measurement of a mode shape on the output side, multi modes as shown in FIG. 9 were observed, and a single mode could not be excited.

Figure 10:
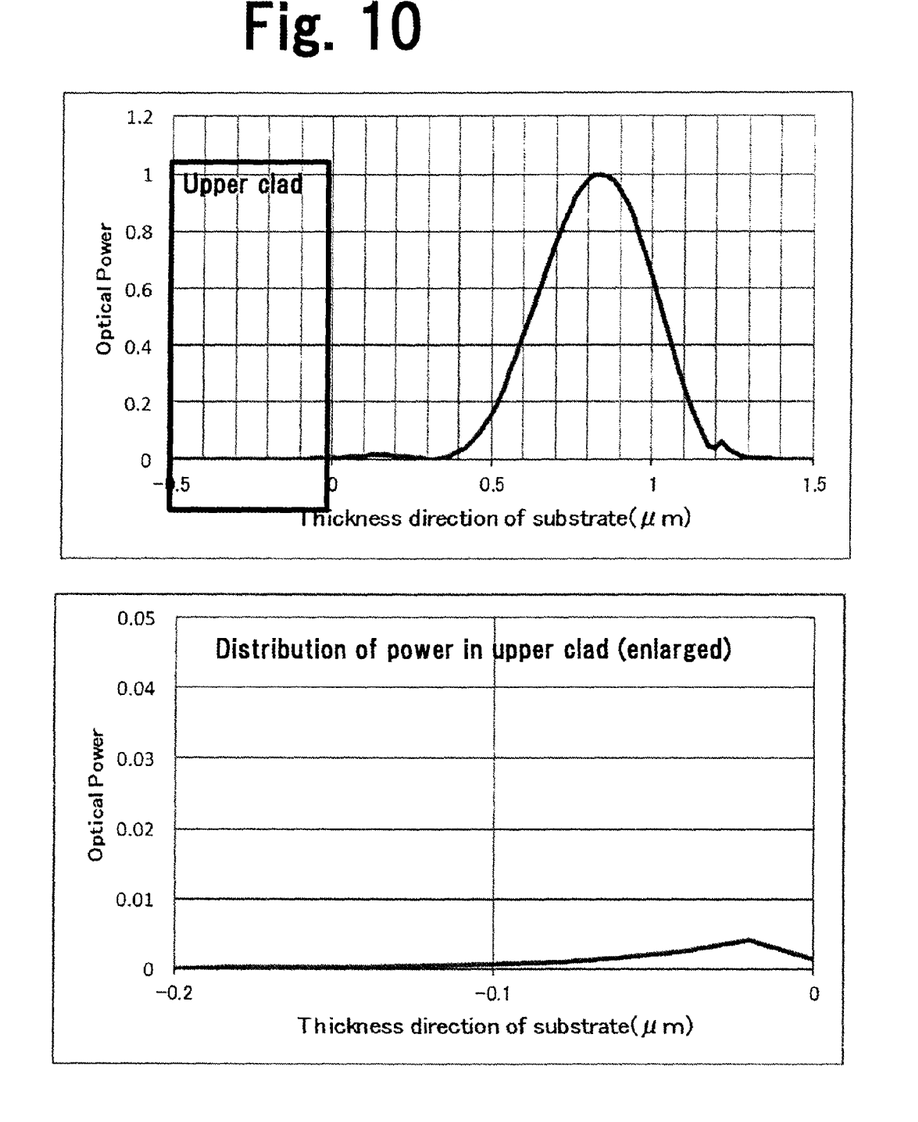
FIG. 10 is a chart showing the distribution of the optical power obtained by using the element of FIG. 8.

As a result of calculation of the mode shape of this structure, it was found that the optical power did not transmit to the top clad side as shown in FIG. 10.

The invention claimed is:

1. An evanescent light generation element for oscillating evanescent light from an optical waveguide to a clad layer: said element comprising:
   a thin layer comprising a ferroelectric single crystal or oriented crystal, having a thickness of equal to or more than 0.4 μm and equal to or less than 2 μm and comprising a first principal surface, a second principal surface, an incident side end surface and an exit side end surface;
   a ridge optical waveguide formed in said thin layer and extending between said incident side end surface and said exit side end surface of said thin layer;
   at least a pair of grooves formed on both sides of said ridge optical waveguide in said thin layer and opening at said first principal surface of said thin layer;
   a support substrate bonded to said first principal surface by one of direct bonding and a bonding layer; and
   a clad layer provided on said second principal surface;
   wherein a width of said ridge optical waveguide at said exit side end surface is less than a width of said ridge optical waveguide at said incident side end surface, said width of said ridge optical waveguide at said exit side end surface being smaller than 1 μm and larger than zero;
   wherein a light propagating in said ridge optical waveguide consists essentially of a linearly polarized optical wave polarized in a normal direction of said second principal surface of said thin layer;
   wherein said light propagating in said ridge optical waveguide is emitted from said exit side end surface; and
   wherein said evanescent light is obtained from said clad layer.

2. The element of claim 1, wherein said ridge optical waveguide comprises a narrow width portion provided in a neighborhood of said exit side end surface, a main body portion extending from said incident side end surface toward said narrow width portion, and a coupling portion provided between said main body portion and said narrow width portion.

3. The element of claim 1, wherein said ridge optical waveguide comprises a tapered portion and a main body portion, said tapered portion being provided in a neighborhood of said exit side end surface, a width of said ridge optical waveguide decreasing toward said exit side end surface in said tapered portion, and said main body portion extending from said incident side end surface toward said tapered portion.

4. The element of claim 1, wherein said thin layer comprises lithium niobate, lithium tantalite, lithium neonate-lithium tantalite solid solution, zinc oxide, gallium arsenide, gallium nitride, indium phosphide, gallium oxide, potassium tantalite or potassium neonate tantalite as a basic composition.

5. The element of claim 1, wherein a refractive index of said thin layer is equal to or more than 2.3.

6. The element of claim 1, wherein a refractive index of said clad layer is equal to or less than 1.4.

7. The element of claim 1, wherein said grooves are formed by laser abrasion, dry etching or wet etching.

8. An evanescent light generation device, comprising:
   said element of claim 1; and
   a laser light source oscillating a laser light to be made incident to said incident side end surface of said thin layer;
   wherein said laser light consists essentially of said linearly polarized optical wave polarized in a normal direction of said second principal surface of said thin layer.

9. The device of claim 8, comprising a diffraction grating functioning as a reflector and formed in said ridge optical waveguide, wherein said laser light source and said diffraction grating together construct a resonator, and wherein laser oscillation is carried out at a reflection wavelength determined by said diffraction grating.

* * * * *